(12) United States Patent
Fang et al.

(10) Patent No.: US 7,526,140 B2
(45) Date of Patent: Apr. 28, 2009

(54) MODEL-BASED LOCALIZATION AND MEASUREMENT OF MINIATURE SURFACE MOUNT COMPONENTS

(75) Inventors: Ming Fang, Princeton Jct., NJ (US); Jenn-Kwei Tyan, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 943 days.

(21) Appl. No.: 11/072,220

(22) Filed: Mar. 4, 2005

(65) Prior Publication Data

US 2005/0169512 A1    Aug. 4, 2005

Related U.S. Application Data

(62) Division of application No. 10/042,887, filed on Jan. 9, 2002, now Pat. No. 6,980,685.

(60) Provisional application No. 60/263,293, filed on Jan. 22, 2001.

(51) Int. Cl.
*G06K 9/40* (2006.01)
*G06K 9/32* (2006.01)

(52) U.S. Cl. ............... 382/266; 382/300; 348/441; 358/525; 708/290

(58) Field of Classification Search ................. 382/266, 382/300; 348/441; 358/525; 708/290
See application file for complete search history.

(56) References Cited

U.S. PATENT DOCUMENTS 6,975,755 B1 * 12/2005 Baumberg .................. 382/154

* cited by examiner

*Primary Examiner*—Aaron W Carter
(74) *Attorney, Agent, or Firm*—Donald B. Paschburg; F. Chau & Associates, LLC

(57) ABSTRACT

A system and method for object inspection includes an object modeler; an iterative object segmentor in signal communication with the object modeler for receiving an input image and model parameters and producing a segmented image; a moment transformer in signal communication with the iterative object segmentor for receiving an input image, model parameters and a segmented image and producing estimates of object translation, rotation and scaling; an edge detector and interpolator in signal communication with the moment transformer for receiving an input image, model parameters and estimates and producing a set of line edges; and an iterative optimizer in signal communication with the edge detector and interpolator for receiving an input image, model parameters, estimates and line edges and producing refined estimates of object translation, rotation and scaling.

11 Claims, 7 Drawing Sheets

The model-based algorithm for localization and measurement of miniature SMC objects.

The model-based algorithm for localization and measurement of miniature SMC objects.

A linear transformation between the model shape and the input image can be parameterized by translation, rotation, and scaling.

A polygon defined by the variables $(l_i, x_1, y_1, \theta_1, k_i, \beta_i)$

Bi-Linear Interpolation

A typical image of the miniature SMC object acquired from a pick-and-place system Images synthesized from our simulation process

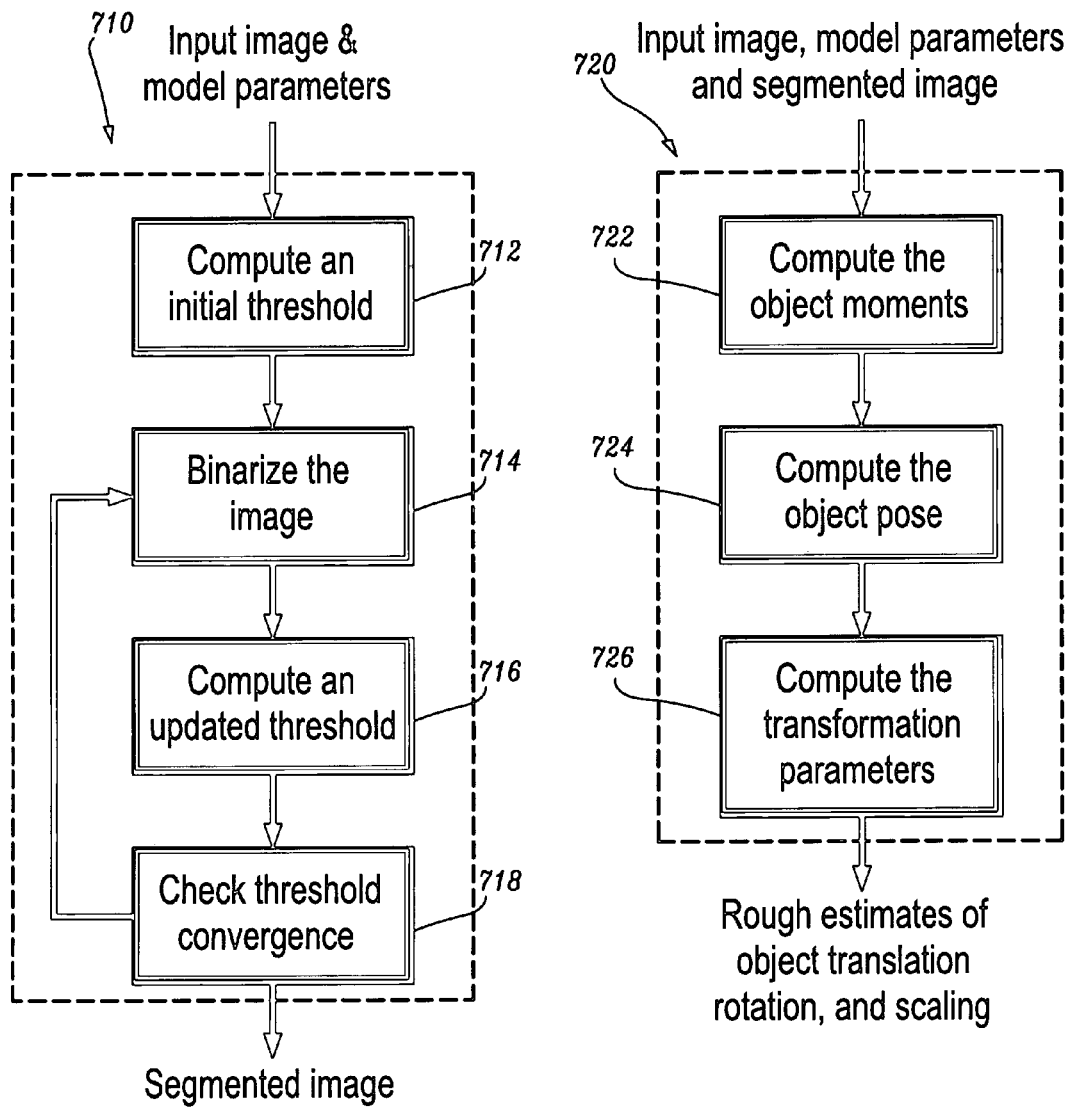

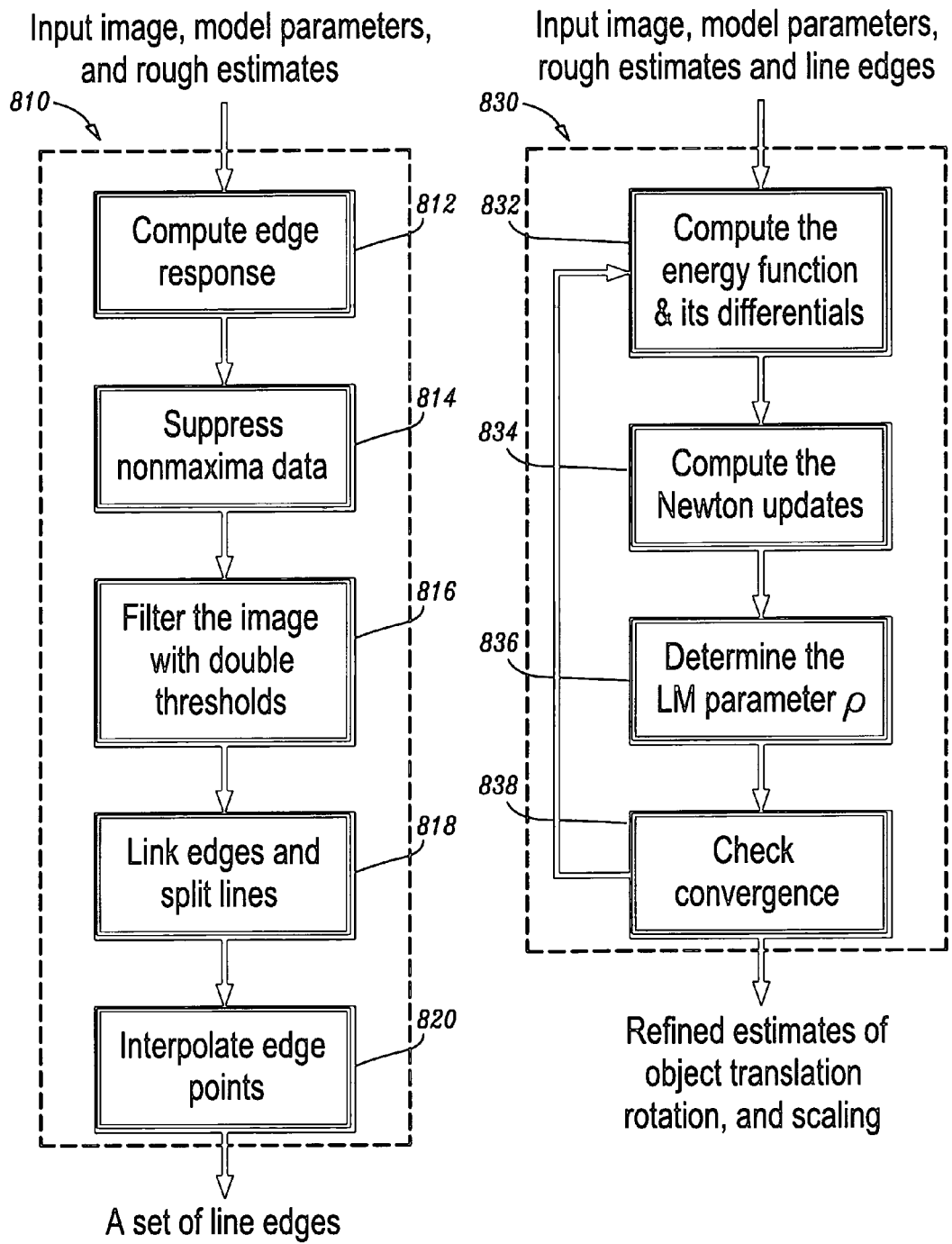

MODEL-BASED LOCALIZATION AND MEASUREMENT OF MINIATURE SURFACE MOUNT COMPONENTS

CROSS-REFERENCE TO RELATED APPLICATION

This application is a divisional of U.S. patent application Ser. No. 10/042,887 filed Jan. 9, 2002 now U.S. Pat. No. 6,980,685, issued Dec. 27, 2005, which claims priority to U.S. Provisional Application No. 60/263,293, filed Jan. 22, 2001, the disclosures of which are incorporated by reference herein in their entirety.

FIELD OF THE INVENTION

The present disclosure relates to fabrication of semiconductor devices, and more particularly, to a system and method for localizing and measuring surface mount components in miniature scale.

BACKGROUND OF THE INVENTION

In semiconductor manufacturing technologies, one important process involves localization and measurement of surface mount component ("SMC") objects for industrial inspection, and more particularly, for pick-and-place applications. Accurate and efficient algorithms are required to achieve reliable inspection tasks, which should be performed robustly under loose image conditions in terms of object appearance, size, pose range, illumination, noise and the like. Such algorithms promise increased flexibility and reduced cost for machine vision systems.

As the geometries of SMC objects become smaller with advances in semiconductor manufacturing capabilities, the pick-and-place systems call for highly demanding inspection of SMC objects in miniature scale. However, the performance of an algorithm is intrinsically bound with the image quality and conditions. Maintaining unlimited image condition quality while also maintaining robustness is not practical. Thus, investigation of how small objects can be correctly localized and measured under the requirements of pick-and-place systems is an area of current interest.

In general, object localization is defined as a problem of finding the pose transformation (i.e., translation, rotation and scaling) between observed and reference data sets lying in two different spaces. Given an evaluation function for the distance and/or energy between two data sets, the pose transformation may be obtained by determining the parameters that result in a minimal value of the evaluation function. In addition to localization, object measurement is performed to find the dimensions between a pair of points and/or lines on the object. For example, the width and the height of an object are desirable measurements. Once the object is detected or localized, object measurement can usually be performed based on line-fitting algorithms.

Numerous object localization and measurement algorithms have been implemented for general industrial inspection applications. These range from correlation-based template matching to generalized Hough transforms and contour-based matching.

However, most of the existing techniques are not suitable for the pick-and-place applications that require inspecting miniature SMC objects. The techniques are generally unsuitable because they are either computationally intensive, have difficulties establishing correspondences between reference data and object data, and/or require extensive and highly reliable data to run in practice. Another problem for measuring miniature SMC objects is that their appearance can vary due to differences in manufacturing processes and the variations in local lighting conditions. Conventional methods were often based on learning-from-example approaches, which become impractical for these applications. In addition, the pick-and-place systems preferably use as few sets of reference data as possible due to limited memory storage.

Therefore, it is desirable that one set of reference data be used for inspecting the same types of objects regardless of their appearance variations. These and other requirements exclude many existing algorithms from consideration for measuring miniature SMC objects.

SUMMARY OF THE INVENTION

The present disclosure provides a system and method for object inspection that includes an object modeler; an iterative object segmentor in signal communication with the object modeler for receiving an input image and model parameters and producing a segmented image; a moment transformer in signal communication with the iterative object segmentor for receiving an input image, model parameters and a segmented image and producing estimates of object translation, rotation and scaling; an edge detector and interpolator in signal communication with the moment transformer for receiving an input image, model parameters and estimates and producing a set of line edges; and an iterative optimizer in signal communication with the edge detector and interpolator for receiving an input image, model parameters, estimates and line edges and producing refined estimates of object translation, rotation and scaling.

The system and method of the present disclosure allows for performing model-based localization and measurement of miniature SMC objects while maintaining speed, accuracy and robustness. The present system and method are also capable of estimating the pose and dimension of the miniature SMC objects.

Embodiments of the present disclosure recognize that an object is located on a simple image background and that a reference data set is modeled with a polygonal shape.

BRIEF DESCRIPTION OF THE DRAWINGS

FIGS. 4A and 4B show diagrams illustrating a bi-linear interpolation according to the present disclosure;

FIGS. 7A and 7B show flowcharts for explaining the object segmentation and the moment transformation of the present disclosure, respectively; and FIGS. 8A and 8B show flowcharts for explaining the edge pixel detection and the pose optimization of the present disclosure, respectively.

DETAILED DESCRIPTION OF PREFERRED EMBODIMENTS

The present disclosure provides a system and method for performing a model-based localization and measurement of surface mount component ("SMC") objects in miniature scale. The algorithm comprises a coarse-to-fine search strategy that fully utilizes available information from the object region and contour.

In a coarse search stage, the moment transformations are combined with an iterative segmentation scheme to enable object localization to be performed in a large search space and produce rough estimates of the pose parameters. Next, a Canny edge detection and interpolation process is applied to estimate an object boundary to be used, in turn, by an iterative optimization procedure to refine the initial estimates. Modeling the object with a polygonal shape and assuming that the input object is located on simple image background are suitable constraints for pick-and-place applications typical in semiconductor assembly. A balance is found between accuracy and image resolution.

Figure 1:
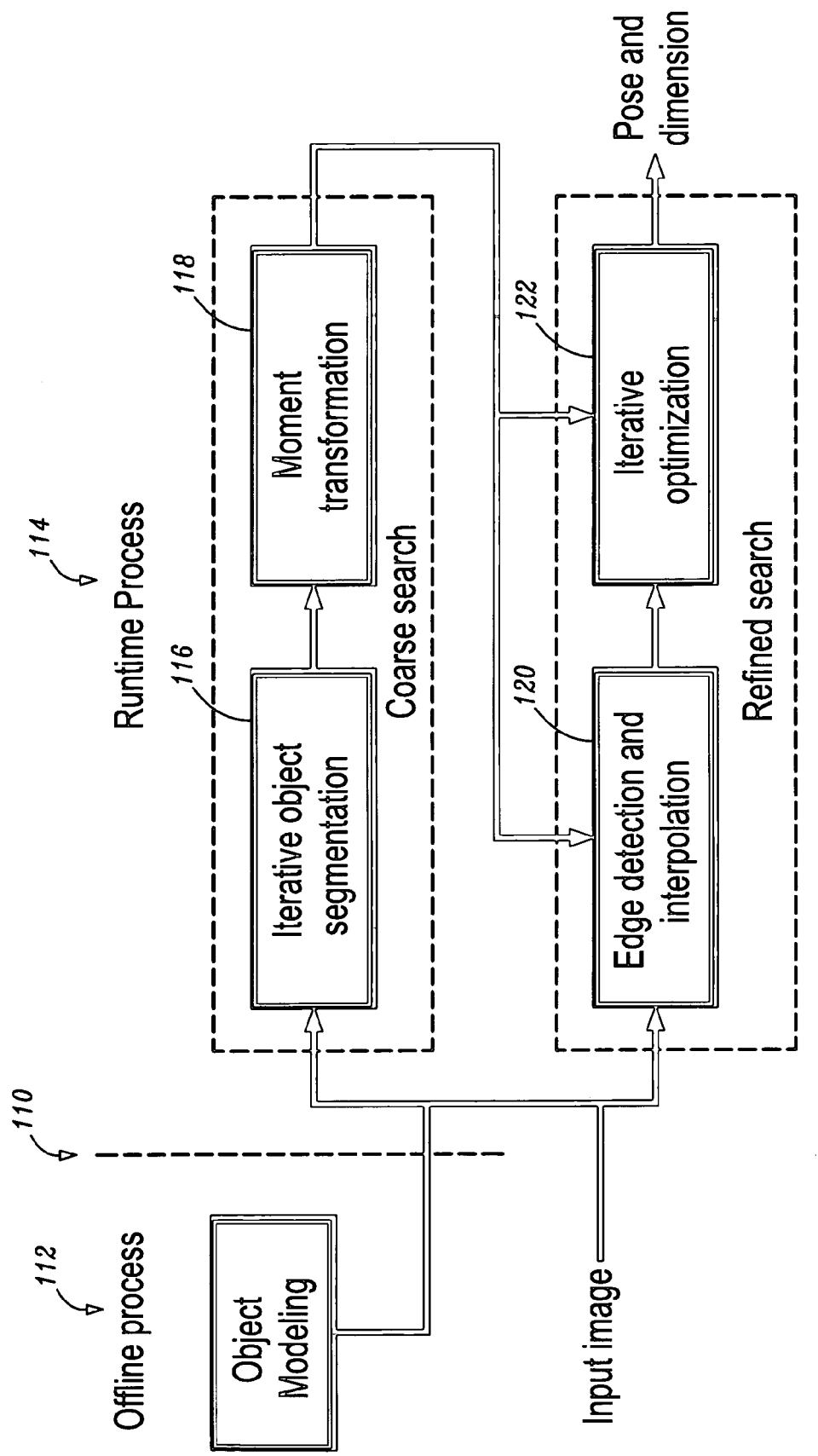
FIG. 1 shows a block diagram depicting a preferred embodiment of a system for localizing and measuring miniature SMC objects according to the present disclosure.

Referring to FIG. 1, an algorithm 110 for pick-and-place applications involves two processes; namely offline modeling 112 and runtime matching 114. In the offline modeling 112 process, an object is modeled as a polygonal shape represented by a set of linear equations. The input to the model can be obtained from the boundary features of CAD data, including the intersection points, edge length, and spatial relations between two edges. The runtime matching 114 process performs the transformation search between the shape model and the input image data. The runtime matching process includes a moment-based search procedure 116, 118 and an iterative optimization procedure 120, 122 that are combined in a coarse-to-fine search strategy.

The coarse search 116, 118 produces rough estimates based on the object region information. The coarse search includes an iterative segmentation scheme 116 to efficiently identify the object in a bi-model image. The pose and scale of the object can then be computed by a set of moment transformations 118. The importance of this step is to enable the localization performed in a large search space for a small number of likely matches. If the estimates are out of the specifications range, a decision can be made at this stage in accordance with prior rule-based knowledge in order to filter the object localization matches.

In contrast to the coarse search, the refinement search 120, 122 relies on object contour information. The optimization procedure 122 is based on a least-squares minimization algorithm, which is subsequently applied to provide accurate estimates based on the initial estimates given by the moment-based search. For this stage, accurate edge pixels are obtained at an edge detection and interpolation block 120. An efficient edge detection algorithm based on the Canny theory is implemented together with a bi-linear interpolation. Embodiments of the present disclosure can reduce the possible outliers and locate accurate pixel positions at a sub-pixel level. The mathematics of each module will be described in greater detail.

To model an arbitrary object, an edge-based polygon with n line segments is defined. Each line segment can be expressed analytically in the form:

$$L_i: X \cos \psi_i + Y \sin \psi_i = d_i \; (i=1, 2 \ldots, n) \quad (1)$$

where $\psi_i$ is the normal angle of the edge $L_i$ and $d_i$ is its normal distance. The 2n parameters of $(\psi_i, d_i)$ associated with the system of n linear equations must satisfy the spatial and angular relationships among the edges of the polygon, and each pair $(\psi_i, d_i)$ should be independent of each other. Based on a prior knowledge of object geometry (e.g., the input of CAD data), the modeling procedure can determine all unknowns $(\psi_i, d_i)$.

An arbitrary polygon profile can be characterized by its size, position, and orientation. A general form of polygon representation is derived by introducing two parameters: the dimensional relationship between edge $L_i$ and $L_j$ (a major edge) defined by $k_i$, and the angular relationship between two consecutive edges $L_i$ and $L_{i-1}$ defined by $\beta_i$. In addition, four parameters $(l_1, x_1, y_1, \theta_1)$ are selected from a major edge as the global variables.

Figure 2:
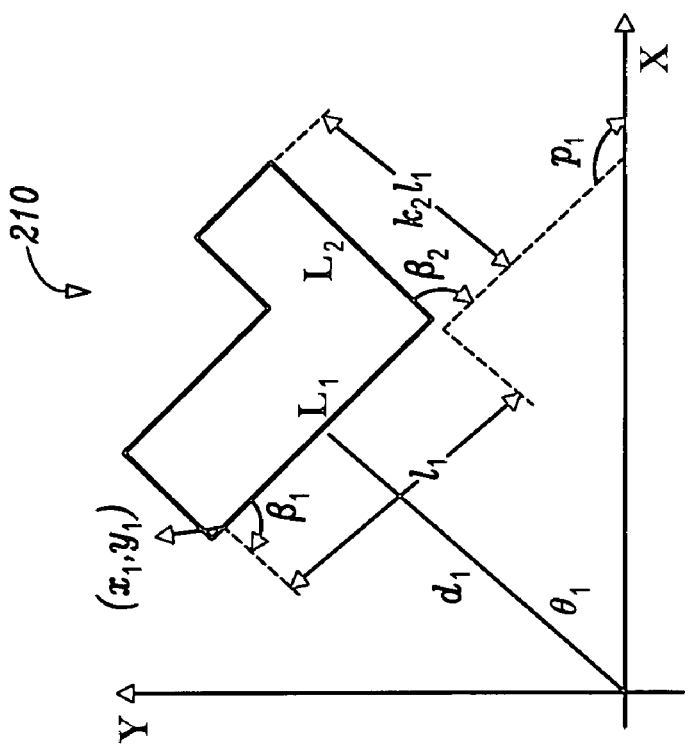
FIG. 2 shows a two-dimensional diagram illustrating a polygon defined by parameters according to the present disclosure.

Turning now to FIG. 2, the parameter definitions are illustrated in the plot 210. The polygonal model is derived as follows: Given $l_1=1$, $(x_1, y_1)=(0,0)$, $\theta_1=0$, and using $(k_i, \beta_i)$ for $i=1, 2, \ldots, n$; each pair $(\psi_i, d_i)$ in Equation (1) can be expressed with $$\psi_i = \tan^{-1} \left( \frac{\cos^2 p_i \sum_{j=1}^{i-1} k_j \sin p_j - \sin p_i \cos p_i \sum_{j=1}^{i-1} k_j \sin p_j}{\sin^2 p_i \sum_{j=1}^{i-1} k_j \cos P_j - \sin p_i \cos p_i \sum_{j=1}^{i-1} k_j \cos p_j} \right) \quad (2)$$

$$d_i = \left[ \left( \sin^2 p_i \sum_{j=1}^{i-1} k_j \cos P_j - \sin p_i \cos p_i \sum_{j=1}^{i-1} k_j \cos p_j \right)^2 + \left( \cos^2 p_i \sum_{j=1}^{i-1} k_j \sin p_j - \sin p_i \cos p_i \sum_{j=1}^{i-1} k_j \sin p_j \right)^2 \right]^{1/2} \quad (3)$$

where $k_i = l_i/l_1$, $p_1 = \pi/2$ and $p_i = \sum_{j=2}^{i-1} \beta_j + \pi/2$ for $i = 2, 3, \ldots n$.

Figure 3:
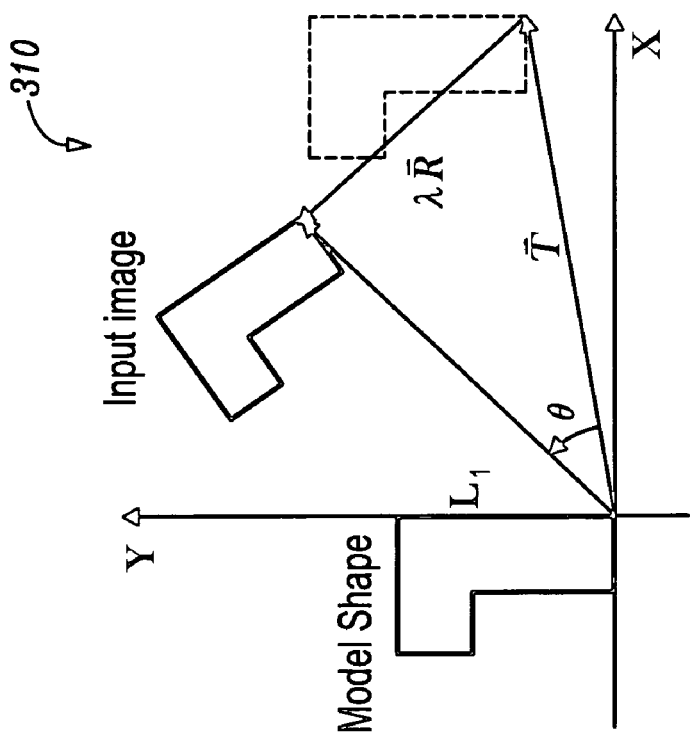
FIG. 3 shows a two-dimensional diagram illustrating the linear transformation between a model shape and an input image according to the present disclosure.

As shown in FIG. 3 by the plot 310, using the polygonal model, object localization and measurement can be performed simultaneously by searching the best match in the input image with a linear transformation parameterized by translation $\bar{T}$, rotation $\bar{R}$ and scaling $\lambda$. This model is used to achieve more precise matching in both the coarse search procedure and the refined search procedure that yields a global optimal solution with respect to the given input.

An objective of a coarse search is to find a set of rough estimates of transformation parameters in a large image space. Two important procedures in the coarse search are object segmentation and moment transformation.

Jumping ahead to FIG. 7A, object segmentation according to image characteristics is accomplished by automatic thresholding of a bi-model image in which the object is located on a simple image background. To do this without human intervention, an iterative segmentation scheme 710 is implemented as follows:

(1) With reference to function block 712, select an initial estimate of the threshold T by using the average gray-level of the 2n brightest pixels in the image, where n is the size of the given model.

(2) With reference to function block 714, segment the image into two regions A (background) and B (object) using T, which assigns all pixels with gray-level less than T to A, and all other pixels to B.

(3) Calculate the mean gray-level $u_1$ and $u_2$, and the associated numbers of pixels $n_1$ and $n_2$ within the regions A and B, respectively.

(4) With reference to function block 716, calculate the new threshold value given by:

$$T = \frac{1}{2}\left[(u_1 + u_2) + (u_1 - u_2)\frac{\log(n_2/n_1)}{\log(n_1 + n_2)}\right] \quad (4)$$

(5) With reference to function block 718, repeat steps (2), (3) and (4) until convergence is achieved, i.e., the values remain stable. The segmented object is obtained from the final pixels in the region B.

The above steps are applied for the region of interest specified by the system, and all values are computed from a 1-D histogram of the image. In addition, both the starting threshold and the iterative threshold take into account the relative sizes of the background and object from prior knowledge, which leads to more accurate thresholding of an image in which the object is relatively small.

Turning now to FIG. 7B, the moment transformation is indicated generally by the reference numeral 720. The transformation parameters between the model shape and the segmented object are estimated via a set of moment transforms. With respect to function block 722 for an object image $I(x,y)$, the definition of its two-dimensional moment of order $(p+q)$ is given by:

$$M_{pq} = \sum_x \sum_y x^p y^q I(x, y) \quad (p, q = 0, 1, \ldots) \quad (5)$$

With respect to function block 724, the object position, principle angle, and scaling change represented with respect to the above equation can be derived as follows: The position $(\bar{x},\bar{y})$ defined by the center of gravity $I(x, y)$, is determined by normalizing the first order moment in x and in y respectively, i.e., $$\bar{x} = \frac{M_{10}}{M_{00}}, \bar{y} = \frac{M_{01}}{M_{00}} \quad (6)$$

To determine the object orientation, the moments need to be transformed to the gravity position $(\bar{x},\bar{y})$ that gives the normalized moments $\mu_{pq}$ written by:

$$\mu_{pq} = \sum_{r=0}^{p} \sum_{s=0}^{q} \binom{p}{r}\binom{q}{s}(-\bar{x})^{p-r}(-\bar{y})^{q-s} M_{rs} \quad (7)$$

If $\mu_{pq}$ is transformed to align with the principal axes of the object image, the angle of orientation is derived by:

$$\theta_i = \frac{1}{2}\tan^{-1}\left\{\frac{2\mu_{11}}{\mu_{20} - \mu_{02}}\right\} \quad (8)$$

where $\theta_i$ is with respect to either the major principal axis or the minor principal axis of the object.

One way to determine a unique orientation of the principal axis is to set the additional constraints that $\mu_{20} > \mu_{02}$ and $\mu_{30} > 0$. The correct principal angle will be $\theta_i + n\pi/2$ where n is chosen to satisfy that constraint. In practice, there may be a 4-fold symmetry object that has identical principal axes. The fourth-order rotational moments must be used to determine the angle of orientation, which yields:

$$\theta_i = \frac{1}{4}\tan^{-1}\left\{\frac{4(\mu_{31} - \mu_{13})}{\mu_{40} + \mu_{04} - 6\mu_{22}}\right\} \quad (9)$$

If this equation is selected to run in the process, the correct principal angle will be $\theta_i + n\pi/4$ where n can be chosen based on the sign of the tangent function.

The scaling change is usually obtained by comparing the area of the segmented object with the model. If object size is abnormal, an earlier decision can be made by the system. The decomposition of the scaling factor in the x and y directions, respectively, that are required by the subsequent matching process are given by:

$$\lambda_x = \frac{1}{\sqrt{\mu_{20}}}, \lambda_y = \frac{1}{\sqrt{\mu_{02}}} \quad (10)$$

where the numerator corresponds to the model size normalized to 1 unit.

For the sake of computational savings, the above transformations can be obtained through a lookup table. Next, with respect to function block 726, the transformation parameters between the input image and the shape model are estimated based on both objects' position, principal angle and scaling factor. It should be noted that the rotation relationship is the difference between an object's principle angle and the model's, but the translation relationship is a function of rotation and scaling which is defined in a later section.

Turning now to FIGS. 8A and 8B, the refinement search comprises pose and size refinement which is formulated as a best-fit minimization problem where they are estimated based on the sum of the squares of the errors between the input data and the shape model. To obtain the best estimates, the errors can be minimized analytically or numerically by an edge detection method 810 and an optimization procedure 830.

An accurate edge pixel detection algorithm 810 can ensure that all input data are suitable for the fitting process. According to the Canny theory, the edge detection should perform four processes: Gaussian filtering, edge magnitude and orientation computing, non-maxima suppression and double thresholding. Without prior knowledge and/or further processes, the edge detection could be computationally expensive and the results might not be suitable for the optimization procedure. By utilizing the results of the coarse search and model geometry, the detection process can be greatly simplified while obtaining the best edge location at sub-pixel accuracy. The procedure is given as follows:

First, with respect to function block 812, a small window is used for selecting pixels spatially along the border of a segmented object, which easily removes much unwanted area. The Gaussian filter is only convoluted with these pixels, which smoothes any noise points. Since the object size is relatively small and the noise effect is considered minor in a well-controlled image environment, the mask of a Gaussian filter is limited to a small size. A typical 3×3 window is good enough for this application of the present embodiment. The gradient of the smoothed image can be estimated based on an averaging of 2×2 first-difference approximations. Instead of using floating-point arithmetic, a lookup table can be implemented to efficiently compute the gradient magnitude and orientation of each filtered pixel.

Next, with respect to function block 814, the algorithm performs non-maxima suppression that thins the ridges of gradient magnitude by suppressing all values along the line of the gradient that are not peak values of a ridge. Each pixel is compared in a 3×3 neighborhood and is retained only if its gradient is a local maximum. In general, it is not sufficient to identify the edge pixel by its gradient magnitude alone. The edge pixel is preferably suppressed by considering the rough estimate pose and shape geometry. For example, a rectangle shape may have its edge orientation orthogonal to one of the objects principal axis. The edge pixel should be retained not only for a local gradient maximum, but also if its gradient orientation satisfies the given pose.

With respect to function block 816, to further reduce the number of false edge pixels caused by noise and fine structure, the algorithm applies a double thresholding to the non-maxima suppressed gradient image. Selection of the thresholds is based on a statistical mean $\eta$ and a standard deviation $\sigma$ of the pixel gradient magnitude. Two thresholds $T_1$ and $T_2$, with $T_1=\eta+\sigma/4$ and $T_2=\eta-3\sigma/4$, are suitable for this case. Therefore, any pixel in the image that has a value greater than $T_1$ is presumed to be an edge pixel, and is marked as such immediately. Any pixels that are connected to this edge pixel and that have a value greater than $T_2$ are also selected as edge pixels and marked accordingly. The marking of neighbors can be done recursively until the edges are linked to the contour.

Next, with respect to function block 818, the detected contour is segmented into lines by using a recursive splitting technique. If the pixel is identified as a splitting point, it will be counted twice for the subsequent matching process. In addition, with respect to function block 820 for increased accuracy, all detected pixel positions are preferably refined via a bi-linear interpolation.

Figure 4A:
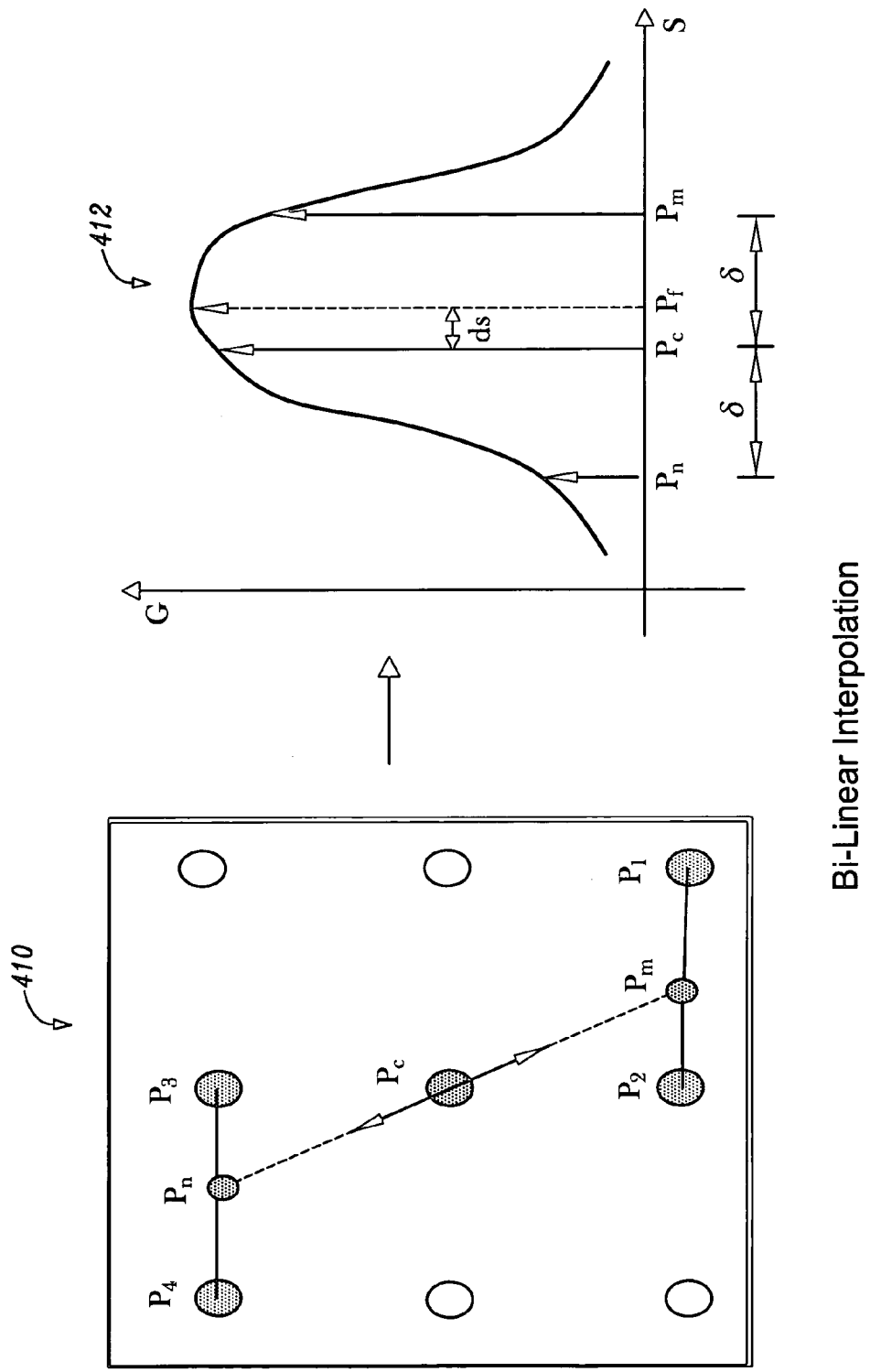

A general case is shown in FIGS. 4A and 4B. In a 3×3 neighborhood 410, following the gradient from the center pixel $P_c$ in both positive and negative directions leads to intersections at the pixels marked $P_m$ and $P_n$. The gradient magnitudes of $P_m$ and $P_n$ are linearly interpolated by using the pixels ($P_1$,$P_2$) and ($P_3$,$P_4$), respectively. Then, the $P_c$, $P_m$ and $P_n$ gradient magnitudes can be interpolated with a quadratic function as shown in plot 412, which determines the offset distance ds given by:

$$ds = \frac{\delta}{2}\left[\frac{G(P_m) - G(P_n)}{2G(P_c) - G(P_m) - G(P_n)}\right] \quad (11)$$

where $\delta$ is the interval from $P_c$ to $P_m$ and $P_n$, and G represents the gradient function. The bi-linear interpolation gives the edge pixel to sub-pixel resolution, which will provide results that are more desirable for the refinement process.

In FIG. 8B, the optimization procedure 830 uses a set of 2-D points detected from object contour and rough estimates, as provided by the moment transformations. Accurate matching between the polygonal model and the detected object is determined by a least-squares minimization technique. In a 2-D linear transformation with size changes, the transformed location (u,v) at the location (x,y) can be written as:

$$\begin{pmatrix} u \\ v \end{pmatrix} = \begin{pmatrix} \lambda_x & 0 \\ 0 & \lambda_y \end{pmatrix}\begin{pmatrix} \cos\theta & -\sin\theta \\ \sin\theta & \cos\theta \end{pmatrix}\begin{pmatrix} x \\ y \end{pmatrix} + \begin{pmatrix} \Delta x \\ \Delta y \end{pmatrix} \quad (12)$$

where ($\Delta x,\Delta y$) is the translation vector, $\theta$ is the rotation angle, and ($\lambda_x,\lambda_y$) is the size scaling in the x and y directions, respectively.

Returning to FIG. 3, such a relationship is illustrated. From Equation (1) and Equation (12), an objective function E is derived based on Euclidean distance that measures the error between the edge points and the model. It is represented by:

$$E(\Delta x, \Delta y, \theta, \lambda_x, \lambda_y) = \frac{1}{M}\sum_{i=1}^{N}\sum_{j=1}^{M_i} w_{i,j}[\lambda_x^{-1}(x_{i,j} - \Delta x)\cos(\theta + \psi_i) + \lambda_y^{-1}(y_{i,j} - \Delta y)\sin(\theta + \psi_i) - d_i]^2 \quad (13)$$

where $$M = \sum_i m_i.$$

is the total number of the edge points, and $w_{i,j}$ is the weighting factor associated with the data gradient at the location ($x_{i,j},y_{i,j}$).

With respect to function block 832, the error function E is parameterized by the translation, rotation and scaling; and the best solution is defined at its minimum value position. Given a good initial estimate, any gradient-based methods may be employed to solve this minimization problem. Since both the Gradient and the Hessian matrix can be computed, a quasi-Newton method is implemented that iterates Newton updates at function block 834 to obtain the least-squared solution very efficiently. With respect to function block 836, in order to avoid a local minimum, the Levenberg and Marquardt technique is used to achieve a smooth iteration, which is by multiplying the diagonal elements of the Hessian matrix with a small factor (1+$\rho$). The $\rho$ is initially set to 0.001 and decreased/increased by 10, depending on the function value, at each iteration. The convergence is checked at function block 838, and the above steps repeated until convergence is achieved. This method as used to locate the minimum value is robust and works very well in practice.

Once the solution is obtained, the object pose and the dimension of the object of interest can be properly converted from model geometry. The following outlines the optimization procedure:

---

Starting from initial estimates $A_0 = (\Delta x, \Delta y, \theta, \lambda_x, \lambda_y)_0$
While $dA_i > \epsilon$ and i < maximum iteration
    Compute $E(A_i)$, Gradient $G(A_i)$, and Hessian $H(A_i)$,
    Compute $\hat{A} = A_i - [\rho H(A_i)]^{-1} \cdot G(A_i)$
    If $E(\hat{A}) < E(A_i)$ then
        Decrease $\rho$ by 10 and set $A_{i+1} = \hat{A}$
    Else
        Increase $\rho$ by 10
    Increment i
End

---

Note that $A_i$ is the iterative update of $(\Delta x,\Delta y,\theta,\lambda_x,\lambda_y)_i$, $dA_i=[\rho H(A_i)]^{-1}\cdot G(A_i)$, and $\epsilon$ is a preset error. Often, the initial estimate provided from the coarse search is relatively close to the real solution, which leads the optimization procedure to converge in a narrow range very efficiently.

Figure 5:
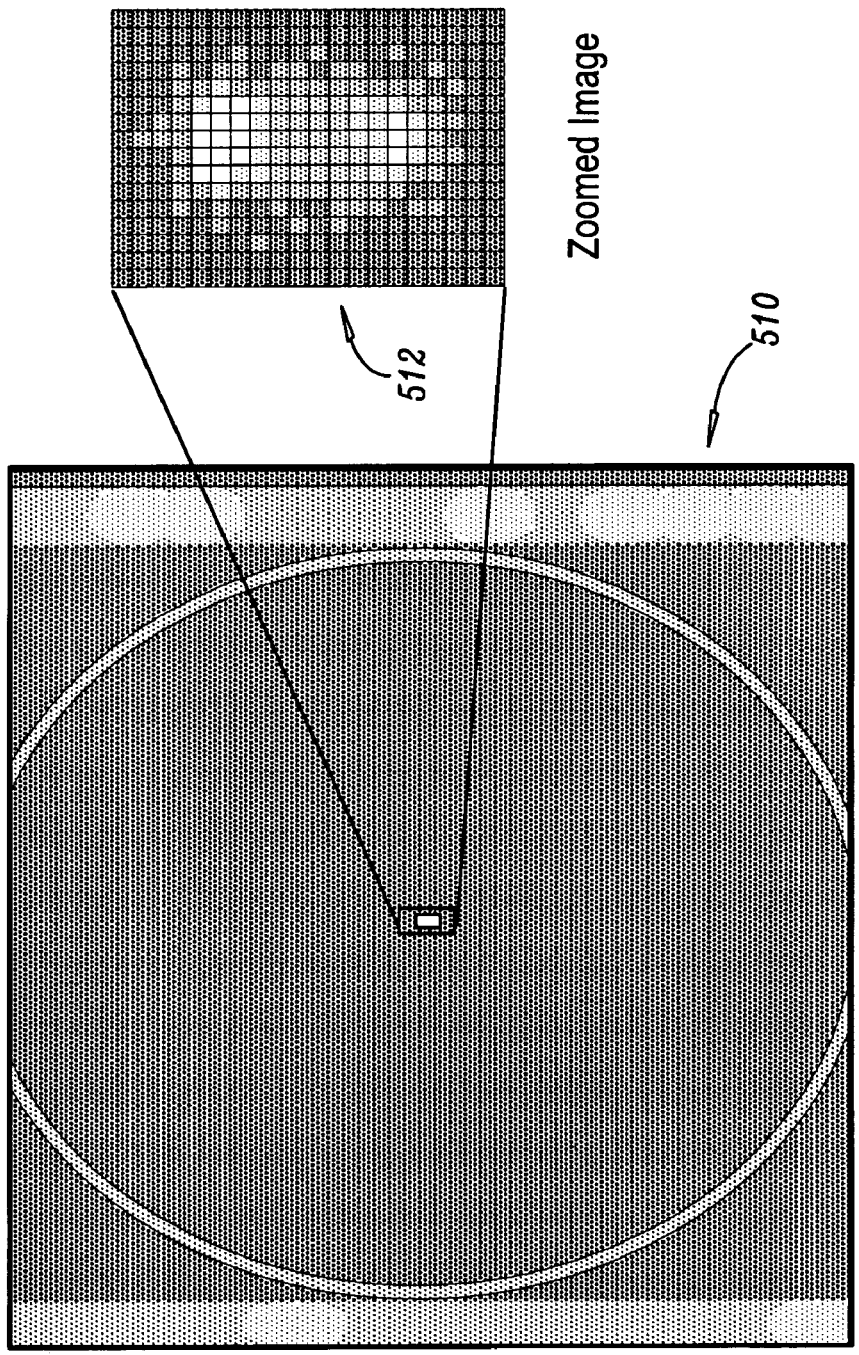
FIG. 5 shows a typical image of a miniature SMC object acquired from a pick-and-place system.

As shown in FIG. 5, a typical system image 510 and a zoomed region 512 of the miniature SMC object are illustrated. The proposed algorithms have been implemented and tested for general behavior and particularly with respect to accuracy versus object size. The experiments were conducted based on real system images in which the object size is varied from 6×6 pixels to 18×36 pixels.

To obtain the statistical results, a data set was synthetically generated that takes into account the changes of object position, rotation, scaling, illumination, noise level and so on. For each object image, a set of transformations drawn randomly from a uniform distribution was applied, including the translation in the interval [−100 pixels, 100 pixels]$^2$, the rotation in the interval [−45°, 45°], and the scaling in the interval [−10%, 10%]$^2$.

Figure 6:
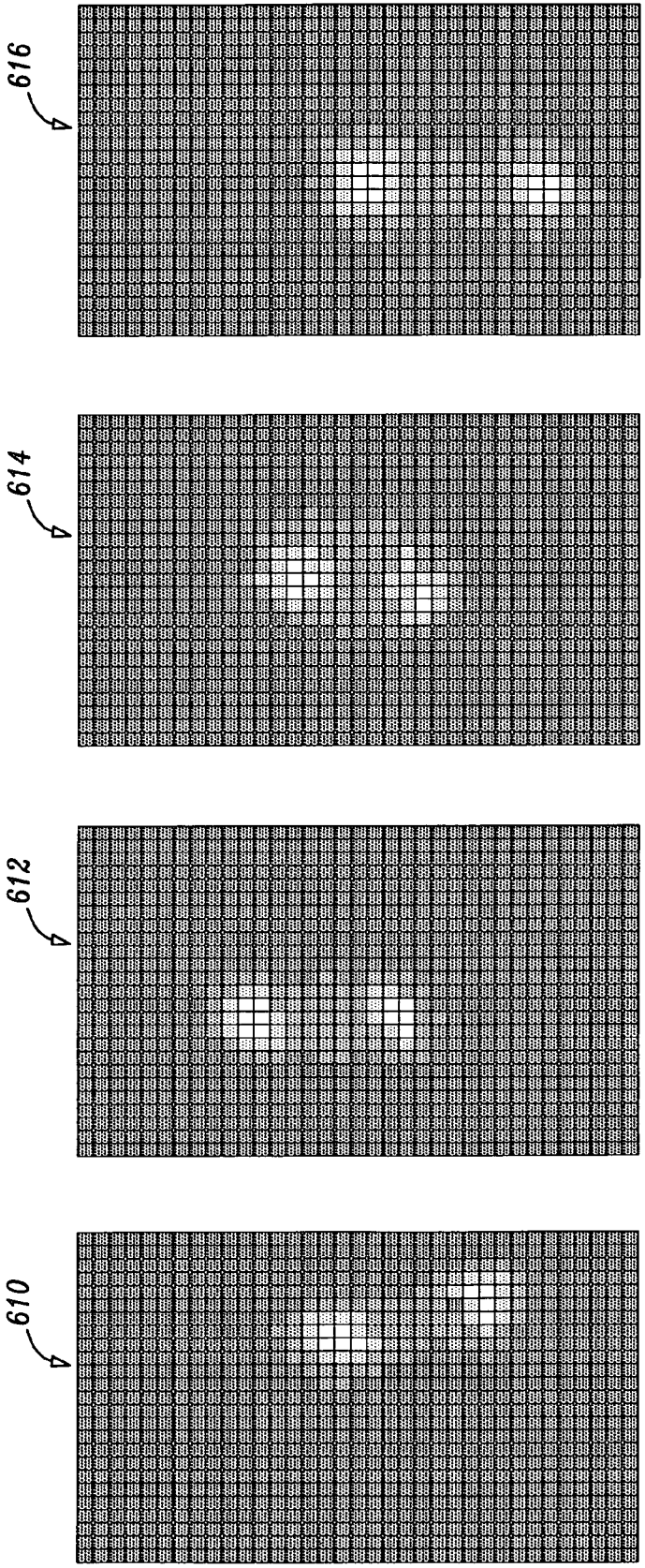
FIG. 6 shows images synthesized from simulation processes according to the present disclosure.

FIG. 6 shows several samples indicated by the reference numerals 610, 612, 614 and 616, respectively. The global illumination changes were simulated by randomly generating values that multiply and offset the pixel gray-level from the uniform distributions of the interval [0.8,1.2] and [−50,50], respectively. To add the noise effect, a multiplicative noise was imposed on each pixel with a factor randomly selected from three different uniform distributions in the range of 1±5%. Next, all the intensity values were rounded to the closest integer values between 0 and 255 to simulate the quantization process. The images generated from the above simulation method are considered reasonable against a real system variation.

The object shape was experimentally modeled as a rectangle, which is suitable for many miniature SMC objects of interest. Five different objects with pixel sizes of about 6×6, 6×12, 9×18, 12×24 and 18×36 were selected. Each object image was synthesized by up to 50 images with the random transformation process. Results indicating the standard deviation errors in translation, rotation and scaling are tabulated in Table 1.

TABLE 1

The standard deviation errors for five different object sizes.

| | OBJECT SIZE | | | | |
|---|---|---|---|---|---|
| | 6 × 6 PIXELS | 6 × 12 PIXELS | 9 × 18 PIXELS | 12 × 24 PIXELS | 18 × 36 PIXELS |
| Errors in Δx pixels | 2.19 | 1.92 | 0.63 | 0.29 | 0.12 |
| Errors in Δy pixels | 2.36 | 2.53 | 0.64 | 0.32 | 0.18 |
| Errors in θ degrees | 4.86 | 2.84 | 1.50 | 1.06 | 0.71 |
| Errors in $\lambda_x$ percent | 0.17 | 0.13 | 0.03 | 0.014 | 0.006 |
| Errors in $\lambda_y$ percent | 0.28 | 0.23 | 0.03 | 0.019 | 0.007 |

The algorithms were less accurate when object size was reduced to 6×12 and 6×6 pixels. However, the results are improved as object size is increased. The object size of 9×18 pixels drops error drastically from smaller objects, but its robustness is subject to image conditions, noise levels and scaling factors. For example, the ±20% size scaling can easily lead this size to erroneous results. The object sizes of 12×24 pixels and larger are feasible to meet the preferred system requirements. The experiments also indicate that the object size of 1 8×36 pixels works very well for this embodiment. Note that translation error is not equivalent to the object position error in the image space. In addition to accuracy, the speed was tested and varied from 40 ms to 100 ms on a 600 MHz Pentium PC, dependent on the object size. The memory storage is currently less than 10 KB per SMC type, including model and system parameters.

The described algorithm for localization and measurement of miniature SMC objects takes into account system requirements including large search range, less memory storage, and permissible object appearance variations. It also shows speed efficiency where the pose and the dimension of an object can be estimated simultaneously in the single process by properly modeling a polygonal shape. Utilizing all information from the object region and contour, the algorithm provides excellent results.

However, as the object size becomes smaller, two systematic errors affect the accuracy. The first is subject to the image quantization error, due to the fact that each digitized image does not have enough information to represent a real pose of the object. The second error source is the presence of outliers, i.e., the data points extracted from a device image that are not desirable for the algorithms to process. Outliers mainly result from variations in lighting, noise or other aspects of the imaging process. Research shows that the machine vision techniques according to embodiments of the present disclosure can be used to inspect miniature SMC objects. Based on current experiments, object sizes above 12×24 pixels present feasible system applications.

It is to be understood that the teachings of the present disclosure may be implemented in various forms of hardware, software, firmware, special purpose processors, or combinations thereof. Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which is executed via the operating system. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A computer readable medium embodying a program of instructions executable by machine to perform steps for automatically detecting nodules from image data, the steps comprising:

receiving an image having an object corresponding to an object type;

iteratively segmenting the object;

applying a moment transformation to the segmented object;

measuring the object, wherein measuring the object comprises: detecting and interpolating edges of the object; and iteratively optimizing results of the measurement;

offline modeling of the object type; and runtime matching of the object corresponding to the object type, wherein runtime matching comprises: receiving the image having the object corresponding to the object type; performing a coarse search for the object; and performing a refined search for the object, wherein performing a coarse search comprises localizing the object from the image in accordance with a model, and wherein performing a refined search comprises measuring the localized object, wherein localizing comprises: iteratively segmenting the object; and applying the moment transformation to the segmented object, and wherein iteratively segmenting the object comprises:
  selecting an initial estimate of a threshold by using the average gray-level of the 2n brightest pixels in the image, where n is the size of the model;
  segmenting the image into a background region and an object region in accordance with the threshold, with the pixels having a gray-level less than the threshold being assigned to the background region and all other pixels being assigned to the object region;
  calculating the mean gray-levels within the background and object regions, respectively;
  calculating a new threshold in accordance with the calculated mean gray-levels and the number of pixels in each region;
  repeating the above steps of segmenting, calculating gray-levels and calculating new thresholds until convergence is reached; and
  obtaining the segmented object from the final pixels in the object region.

2. An object inspection system comprising:
a computing apparatus, implemented using hardware or a hardware/software combination, that includes:
  an object modeler;
  an iterative object segmentor in signal communication with the object modeler;
  a moment transformer in signal communication with the iterative object segmentor;
  an edge detector and interpolator in signal communication with the moment transformer; and
  an iterative optimizer in signal communication with the edge detector and Interpolator,
wherein the iterative object segmentor is for receiving an input image and model parameters and producing a segmented image, the iterative object segmentor comprising:
  a threshold computer;
  an image binarizer in signal communication with the threshold computer;
  a threshold updater in signal communication with the image binarizer; and
  a threshold convergence checker in signal communication with the threshold updater.

3. An object inspection system as defined in claim 2 wherein the moment transformer is for receiving an input image, model parameters and a segmented image and producing estimates of object translation, rotation and scaling, the moment transformer comprising:
  an object moment computer;
  an object pose computer in signal communication with the object moment computer; and
  a transformation parameter computer in signal communication with the object pose computer.

4. An object inspection system comprising:
a computing apparatus, implemented using hardware or a hardware/software Combination, that includes:
  an object modeler;
  an iterative object segmentor in signal communication with the object modeler;
  a moment transformer in signal communication with the iterative object segmentor;
  an edge detector and interpolator in signal communication with the moment transformer; and
  an iterative optimizer in signal communication with the edge detector and interpolator,
wherein the edge detector and interpolator is for receiving an input image, model parameters and estimates and producing a set of line edges, the edge detector and interpolator comprising:
  an edge response computer;
  a non-maxima data suppressor in signal communication with the edge response computer;
  a double-threshold image filter in signal communication with the non-maxima data suppressor;
  an edge linker and line splitter in signal communication with the double-threshold image filter; and
  an edge point interpolator in signal communication with the edge linker and line splitter.

5. An object inspection system comprising:
a computing apparatus, implemented using hardware or a hardware/software combination, that includes:
  an object modeler;
  an iterative object segmentor in signal communication with the object modeler;
  a moment transformer in signal communication with the iterative object segmentor;
  an edge detector and interpolator in signal communication with the moment transformer; and
  an iterative optimizer in signal communication with the edge detector and interpolator,
wherein the iterative optimizer is for receiving an input image, model parameters, estimates and line edges and producing refined estimates of object translation, rotation and scaling, the iterative optimizer comprising:
  an energy function and differential computer;
  a Newton updater in signal communication with the energy function and differential computer;
  a parameter determination unit in signal communication with the Newton updater; and
  a convergence checker in signal communication with the parameter determination unit.

6. A computer readable medium as defined in claim 1 wherein offline modeling comprises:
  receiving reference data for objects corresponding to the object type; and
  providing a model for the object type in correspondence with the received reference data.

7. A computer readable medium as defined in claim 6 wherein the received reference data comprises computer aided design parameters for objects corresponding to the object type.

8. A computer readable medium as defined in claim 6 wherein the provided model comprises a polygonal shape.

9. A computer readable medium as defined in claim 1 wherein the received image comprises an object located on a simple image background.

10. A computer readable medium as defined in claim 1 wherein localizing comprises estimating the pose of the object, and wherein measuring comprises estimating the dimension of the object.

11. A method for automatically detecting nodules from image data, the method comprising, using a computer to perform the step of: receiving an image having a physical object corresponding to an object type;

iteratively segmenting the object;

applying a moment transformation to the segmented object;

measuring the object, wherein measuring the object comprises: detecting and interpolating edges of the object; and iteratively optimizing results of the measurement;

offline modeling of the object type; and runtime matching of the object corresponding to the object type by at least one of receiving the image having the object corresponding to the object type, performing a coarse search for the object by localizing the object from the image in accordance with a model by at least one of iteratively segmenting the object and applying the moment transformation to the segmented object, and performing a refined search for the object by measuring the localized object, wherein iteratively segmenting the object comprises:

selecting an initial estimate of a threshold by using the average gray-level of the 2n brightest pixels in the image, where n is the size of the model;

segmenting the image into a background region and an object region in accordance with the threshold, with the pixels having a gray-level less than the threshold being assigned to the background region and all other pixels being assigned to the object region;

calculating the mean gray-levels within the background and object regions. Respectively;

calculating a new threshold in accordance with the calculated mean gray-levels and the number of pixels in each region;

repeating the above steps of segmenting, calculating gray-levels and calculating new thresholds until convergence is reached; and obtaining the segmented object from the final pixels in the object region.

* * * * *